United States Patent
Hagood, IV et al.

(10) Patent No.: US 7,105,982 B1
(45) Date of Patent: Sep. 12, 2006

(54) SYSTEM FOR OPTIMAL ENERGY HARVESTING AND STORAGE FROM AN ELECTROMECHANICAL TRANSDUCER

(75) Inventors: Nesbitt Ward Hagood, IV, Wellesley, MA (US); Jeffrey B. Colter, Burlington, MA (US)

(73) Assignee: Polatis Photonics, Inc., Billerica, MA (US)

( * ) Notice: Subject to any disclaimer, the term of this patent is extended or adjusted under 35 U.S.C. 154(b) by 151 days.

(21) Appl. No.: 10/811,311

(22) Filed: Mar. 26, 2004

Related U.S. Application Data

(60) Provisional application No. 60/458,025, filed on Mar. 26, 2003.

(51) Int. Cl.
*H01L 41/113* (2006.01)

(52) U.S. Cl. .................................... 310/319

(58) Field of Classification Search ............... 310/319, 310/339
See application file for complete search history.

(56) References Cited

U.S. PATENT DOCUMENTS

| | | | |
|---|---|---|---|
| 4,657,339 A | 4/1987 | Fick | |
| 5,177,348 A | 1/1993 | Laor | |
| 5,450,508 A | 9/1995 | Decusatis et al. | |
| 5,552,656 A * | 9/1996 | Taylor | 310/337 |
| 6,137,941 A | 10/2000 | Robinson | |
| 6,222,954 B1 | 4/2001 | Riza | |
| 6,263,123 B1 | 7/2001 | Bishop et al. | |
| 6,345,134 B1 | 2/2002 | Laming et al. | |
| 6,411,751 B1 | 6/2002 | Giles et al. | |
| 6,433,465 B1 * | 8/2002 | McKnight et al. | 310/339 |
| 6,465,931 B1 * | 10/2002 | Knowles et al. | 310/316.01 |
| 6,484,114 B1 | 11/2002 | Dickson | |
| 6,556,285 B1 | 4/2003 | Dickson | |
| 6,788,844 B1 | 9/2004 | Ng | |

(Continued)

FOREIGN PATENT DOCUMENTS

WO WO 00/76106 A1 12/2000

(Continued)

OTHER PUBLICATIONS

Ford, J. E., et al., "Micromechanical Fiber-Optic Attenuator with 3 μs Response," *Journal of Lightwave Technology*, 16(9):1663-1670 (1998).

(Continued)

*Primary Examiner*—Thomas M. Dougherty
(74) *Attorney, Agent, or Firm*—Hamilton, Brook, Smith & Reynolds, P.C.

(57) ABSTRACT

A device for collection of energy from mechanical disturbances and distribution of that energy to an electrical load. A transducer converts mechanical energy in the form of forces and displacements into electrical energy in the form of charge pulses. The charge pulses are rectified into a Direct Current (DC) power signal and accumulated and stored in an input storage element. A controlled conversion circuit assures that the voltage on the storage element is maintained within a predetermined optimal range for energy harvesting from the transducer, avoiding the application of peak voltages. The controlled conversion circuit can be hard wired and/or controllably adjustable to match a given disturbance characteristic. Only when the voltage is within the optimal range for a given type of disturbance will the controlled conversion circuit enable a DC/DC converter to further convert the stored energy to a voltage that is coupled to an output storage element. This technique optimizes power conversion by controlling the high voltage to low version conversion process by, for example, sensing the disturbance with external sensor or internal voltage of the system, and then using this information about the disturbance to control how and when the electrical conversion process will occur.

27 Claims, 7 Drawing Sheets

U.S. PATENT DOCUMENTS

| | | |
|---|---|---|
| 2003/0048984 A1 | 3/2003 | Ng |
| 2003/0137221 A1* | 7/2003 | Radziemski et al. ........ 310/339 |
| 2003/0143963 A1* | 7/2003 | Pistor et al. ................ 455/127 |
| 2004/0078662 A1* | 4/2004 | Hamel et al. ................. 714/22 |

FOREIGN PATENT DOCUMENTS

| | | |
|---|---|---|
| WO | WO 02/01274 A2 | 1/2002 |
| WO | WO 03/016958 A2 | 2/2003 |
| WO | WO 03/016980 A1 | 2/2003 |

OTHER PUBLICATIONS

Datta, K. B. and Mohan, B. M., "Chapter 4: Analysis of Time-Delay Systems," pp. 127-129, and "Chapter 8: Optimal Control of Linear Systems," pp. 213-234, in *Orthogonal Functions in Systems and Control* (Singapore: World Scientific Publishing Co. Pte. Ltd.) (1995).

Patra, A. and Rao, G. P., "Continuous-time Model-based Self-tuning Control." In *General Hydrid Orthogonal Functions and their Applications in Systems and Control*, M. Thoma, ed. (London: Springer-Verlag London Limited), pp. 71-84 (1996).

Riza, N. A. and Sumriddetchkajorn, S., "Versatile multi-wavelength fiber-optic switch and attenuator structures using mirror manipulations," *Optics Communications*, 169:233-244 (1999).

Sumriddetchkajorn, S. and Riza, N. A., "Fault-tolerant three-port fiber-optic attenuator using small tilt micromirror device," *Optics Communications*, 205:77-86 (2002).

Ji, C., et al., "Electromagnetic Variable Optical Attenuator,"*IEEE/LEOS International Conference on Optical MEMs conference digest*, pp. 49-50 (2002).

Li, J., et al., "A Micromachined Variable Optical Attenuator (VOA)," *Proceedings of the SPIE—International Society for Optical Engineering*, 4582:112-120 (2001).

Endow, Y., "Optimal Control Via Fourier Series of Operational Matrix of Integration," *IEEE Transactions on Automatic Control*, 34(7):770-773 (1989).

Palanisamy, K. R., "Analysis and optimal control of linear systems via single term Walsh series approach," *Int. J. Systems Sci.*, 12(4):443-454 (1981).

Razzaghi, M., "Solution of Linear Two-point Boundary Value Problems via Fourier Series and Application to Optimal Control of Linear Systems," *Journal of the Franklin Institute*, 326(4):523-533 (1989).

Elvin,N.G., Elvin, A.A., Spector, M., *A Self-Powered Mechanical Strain Energy Sensor*, Institute of Physics Publishing,Smart Matter Struct. 10 (2001) 293-299.

* cited by examiner

SYSTEM FOR OPTIMAL ENERGY HARVESTING AND STORAGE FROM AN ELECTROMECHANICAL TRANSDUCER

RELATED APPLICATION(S)

This application claims the benefit of U.S. Provisional Application No. 60/458,025, filed on Mar. 26, 2003. The entire teachings of the above application(s) are incorporated herein by reference.

FIELD OF THE INVENTION

The invention relates to systems and techniques for optimally harvesting, storing and transferring power generated by mechanical disturbances to an electrical load.

BACKGROUND OF THE INVENTION

Harvesting energy from intermittent mechanical disturbances can be of great value for powering remote sensors and other types of electrical circuits such as those supporting wireless transponders. Even if the available disturbances are relatively minor and produce only very small amounts of energy, the sum total of energy collected over time can be enormous benefit for a wide variety of applications. Energy harvesting transducers and energy storage circuitry can effectively provide "self powering circuits" that are far more robust and longer lived than ones powered by a storage battery or can enable hybrid systems with reduced size batteries. These self powered circuits can draw and store energy from mechanical disturbances in the environment around them. This enables them to operate in environments where regular maintenance, to change batteries for example, might be impractical or impossible. The harvested electrical power can be used to provide power for a wide variety of applications such as powering of remote sensors, transmitting telemetry data over a wireless link, local alarm indication, implanted electronic medical devices for therapy or monitoring, and many other uses.

Given the rapid advances in the field of low power circuitry over the last few years, energy harvesting and storage technology is expected to find wide application. Some key requirements for the deployment of these technologies include minimal power consumption, maximum efficiency to optimally harvest and store the power from mechanical disturbances using electromechanical transducers, as well as the need to switch and transform the energy into an optimal form for use by an external application circuit, for example conditioning it to a suitable voltage. Often, the relatively high voltages and currents generated by electromechanical transducers are not readily useable by conventional low power circuitry. Thus, previous energy harvesting technologies suffer from poor efficiencies in collecting, storing and transferring energy from transducers to an application load circuit.

SUMMARY OF THE INVENTION

The present invention differentiates itself from the prior art because it proposes a system and electrical circuit that can be used to efficiently harvest, store and transfer power from mechanical disturbances, and then apply that power to an application circuit under a variety of load conditions. An additional aspect of this invention is the ability to accomplish this based entirely on the energy supplied by the disturbance itself, i.e. with no external power supply needed for the control circuitry.

More particularly, the present invention is a circuit that optimally collects and stores energy from a mechanical disturbance for use by an electrical load. Often, the voltage range that is optimal for collecting energy from an electromechanical transducer is not compatible with the requirements of low power circuit loads. The invention seeks to ensure that these requirements are met.

According to one aspect of the invention, an electromechanical transducer converts mechanical energy in the form of forces and displacements into electrical energy in the form of voltage and charges. One particular type of electromechanical transducer is an electromagnetic coil and moving magnet. Another type of electromechanical transducer is a piezoelectric transducer, here generally referring to a broad class of metallic, ceramic and polymer electro and magnetoactive materials capable of converting electrical energy into mechanical energy or vice versa. Such materials are commonly available piezoelectric ceramics, piezoelectric composites and polymers, electrostrictive ceramics and polymers as well as magnetostrictive materials and other materials in which the mechanical, electrical and/or magnetic fields exist within the transducer materials and are coupled therein. Typically, the voltage outputs for piezo transducers could be in the range of 20 to 100 Volts while low voltage circuits may only require voltages only in the 2 to 15 volt range. Since the average power generated by transducers can be small, on the order of hundreds of microwatts, the available power to operate the switching and conversion functions can be very limited.

This invention recognizes an advantage in storing small amounts of energy over a relatively long period of time in a low leakage environment and then periodically discharging the capacitor into a load whose voltage is typically much lower than the optimal load for the electromechanical transducer. The disturbance may have many characteristics including but not limited to variable amplitude of timing. For instance, the disturbance can consist of a force pulse with constant peak amplitude but whose timing between pulses is not predefined or regular. It can also consist of a continuous excitation waveform of varying amplitude.

A key aspect of this invention is to create a system that can optimize mechanical to electrical power conversion in the face of intermittent or varying disturbances. The load may require a substantially greater amount of power, in the milli-watt to watt range, to operate, (for example) in a burst mode for wireless signal transmission. The circuit does this by harvesting and storing the electrical power generated from the mechanical disturbances in a manner that is optimal for the transducer (maximizing power flow from the disturbance into the electrical domain), and then switch transforms and delivers power to the load application electronics in a manner that is optimal for the given load.

A principal element of this invention is therefore the ability to optimize this power conversion process using intelligent control of the high voltage to low voltage conversion process by, for instance, sensing the disturbance with an external sensor or sensing an internal voltage of the system, and then using this information to control when and how the electrical conversion process should occur. Generally, this function is performed by a controlled conversion element.

The preferred embodiment of the invention includes an electromechanical transducer, a power rectification element, an input storage element, an internally or eternally controlled switch together with a DC—DC converter element (together a controlled conversion element), and an output energy storage element. The transducer transforms mechanical disturbances into electrical AC power which is rectified into DC power and accumulated and stored in an input storage element. The controlled converter holds the voltage applied to the input storage element to within a predetermined range that is optimal for harvesting energy from the transducer. The voltage range can be hardwired into the circuit or controllably adjusted to best match a given disturbance characteristic. In the preferred embodiment, the predetermined optimum range is such that the voltage is not allowed to approach an open circuit peak voltage. For example, a center point of the controlled voltage range can be set to be about one-half of the peak open-circuit voltage of the energy signal supplied by the transducer.

When the voltage is within the optimal range for a given disturbance, the smart converter then, and only then, enables a DC—DC converter to convert this stored energy to a voltage that is usable by the load circuit. At this point, the energy is stored in an output power storage element for use by the application electronics. The output storage element can be a capacitor or battery type element. The controlled conversion process thus runs discontinuously, in such a manner to approximately optimize power transfer from the transducer.

These functions are provided with minimal loss of energy due to parasitic leakage and other types of impairments creating an energy harvesting device powered from the harvested energy itself.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The invention relates to an electrical circuit for optimally harvesting, storing and transferring power generated by mechanical disturbances to an electrical load. The power harvesting circuit efficiently collects and stores energy from mechanical disturbances in an input storage element. The accumulated energy is then converted using a controlled DC—DC converter to the optimal voltage level for the load electronics. The circuit invention thus accumulates and stores energy in the optimal voltage range of the transducer, while delivering the energy at the optimal voltage for the final load at the optimal output voltage.

Figure 1:
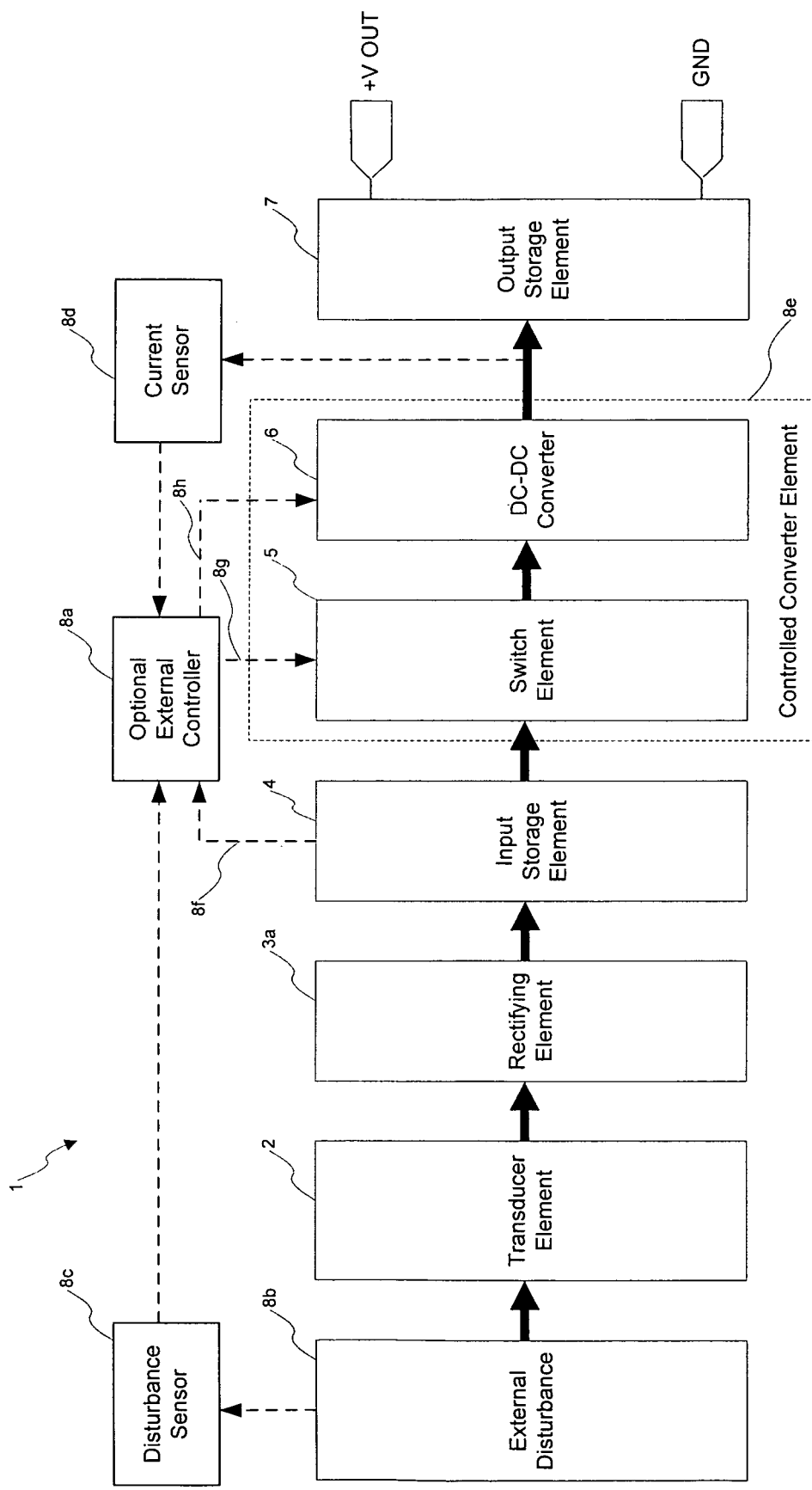
FIG. 1 is a block diagram showing a disturbance, and components of the invention including a transducer, rectifier, input storage capacitor, controlled converter, output storage, and optional external control sensors and circuitry.

A block diagram of one embodiment of the invention is shown in FIG. 1. The circuit 1 is coupled to consists of a mechanical disturbance 8b, and included a electromechanical (possibly piezoelectric) transducer 2, a rectifying bridge made up of diodes 3a, an input storage element 4, a controlled conversion element 8e which in one embodiment can consist of a switch element 5 and a DC—DC converter 6 which is activated when electrical energy is presented to it, and an output storage element 7. The circuit 1 transforms mechanical disturbances into usable power for an electric circuit. Briefly, the piezo transducer 2 converts the mechanical disturbances 8b into electrical signals; the mechanical disturbances can be of a periodic or intermittent nature and can have waveforms of arbitrary time history and amplitude. In particular, the disturbances can consist of a string of irregularly spaced (possibly intermittent) but constant amplitude force or deflection inputs onto the transducer, or the disturbance can consist of a persistent excitation of possibly slowly varying amplitude. It is the intent of this invention to provide a self powered circuit which can maximize mechanical to electrical power conversion under a broad range of input disturbance time histories.

There are two separate parts to the circuit 1 for energy harvesting and storage. One part involves the transfer of energy from the transducer element 2 to the input storage element 4, and the other part involves conversion of that stored energy to some lower voltage (or optionally higher voltage) using the controlled conversion element 8e. In FIG. 1 this second part potentially consists of a voltage sensing switch (5) and DC–DC converter 6. The energy out of the DC—DC converter 6 is then stored in the output storage element 7 for use by an application load circuit (not shown in the drawings).

A key aspect of the invention is the ability to maximize the energy flow from the mechanical disturbance to the load. This is done by keeping the input storage element 4 (specifically, the signal applied thereto) at or near a voltage level which maximizes power transfer from the transducer through the rectifier to the input storage element. As an example shown in FIG. 4, when the input is a time signal whose non-steady component is a given amplitude, this maximum power transfer typically occurs when the input storage element is maintained at a voltage level which is about one-half of the peak non-steady voltage amplitude (Vmax) 305 about the mean 306 that would appear on the transducer (under that excitation) if no extraction circuitry were connected (the open circuit voltage). Non-idealities may push the optimum level slightly off of this value. In general, for any disturbance time history there is an optimum voltage and voltage range wherein the energy transfer through the rectifier element is maximized.

There are a number of ways of directly or indirectly achieving the goal of maintaining the input storage element at the optimal values. These can be categorized as direct and indirect techniques. Direct techniques measure, sense or otherwise determine the voltage level on the input storage element and control to a optimal voltage level or range, shown in FIG. 5 as 410. This optimal range, discussed in detail below, can be hardwired into the electronics by, for instance, component choices (good when the amplitude is well known) or can be determined from an external controller 8a in the case that the amplitudes are not well known. Indirect systems measure something besides the input storage element voltage, for instance, average current into the output storage element using a current sensor 8d (proportional to output power delivered to a load), and then control to optimize this alternate objective, indirectly maintaining the input storage element at the optimal voltage level.

As shown in FIG. 1, the primary controlling element is a controlled conversion element 8e. This controlled conversion element operates under external or internal control so as to maintain the input storage element within its optimal voltage range. In the case of external control, external sensor elements (8c, 8d and 8f) can be used as inputs into a control element 8a (potentially a very low power microprocessor), to determine control signals to the controlled conversion element. These control signals (8g and 8h) can consist of target voltage levels presented to comparators, direct control of switches internal to the controlled conversion elements, or direct control of the values of critical element in the controlled conversion element; for instance, electrically controllable resistor elements. The core function of the control will be to optimize power flow into the input storage element by choosing the right voltage levels for a given disturbance.

As an example, an external sensor of the disturbance 8c, for instance an accelerometer or strain sensor or other mechanical sensor which can be correlated to disturbance amplitude, can be used by the external control element 8a to determine the preset optimal voltage levels for a given disturbance sensor signal using an internally stored look up table. The look up table can be pre-entered into the controller or derived from calibration of the system after installation. These predetermined optimal levels can be provided to the controlled conversion element 8e or used as input into a servo loop which drives the input storage voltage to that value by intermittently activating the down conversion from the input storage to the output storage through control signals to either the controlled conversion element 8e or the switch 5 or DC—DC converter 6 through the control signals, 8g and 8h. This intermittent activation, for instance varying the "on" duty cycle of the DC—DC converter, can be used to maintain the input storage voltage to the external controller provided optimal levels.

Information provided to the external controller 8a can come from alternate sensors, for instance current sensors on the output storage element 8d (measuring current into the storage element and therefore measuring electrical power into the output storage element), or voltage sensors at different places on the circuit, for example sensors measuring the voltage at the input storage element 8f. In the case of input storage voltage measurement, care must be taken to reduce leakage through the sensing circuitry. This can be done by using a switch structure similar to that of element 5 which can be used to controllably connect the sensor signal to the sensor circuitry only when it is sampled or enabled, leaving it unconnected most of the time and thereby limiting leakage.

As another example, the controller 8a can periodically turn off the down conversion process to let the input storage element rise to the open circuit voltage level associated with the current state of the input disturbance. One this open circuit voltage is reached the voltage can be sampled as above and determined; the external controller can control the controlled conversion element to drive the input storage element to one-half of that open circuit voltage, $V_{max}$, 305. In this way the controller can determine the disturbance amplitude and adjust to it on a periodic basis.

Finally, the external controller 8a can allow the controlled conversion element 8e to respond to other needs of the application electronics. For instance, when a critical message is to be sent and extra power is needed for the transmission, the controlled conversion element can be commanded to completely drain the input storage element rather than maintain it at the optimal power harvesting levels.

Figure 2:
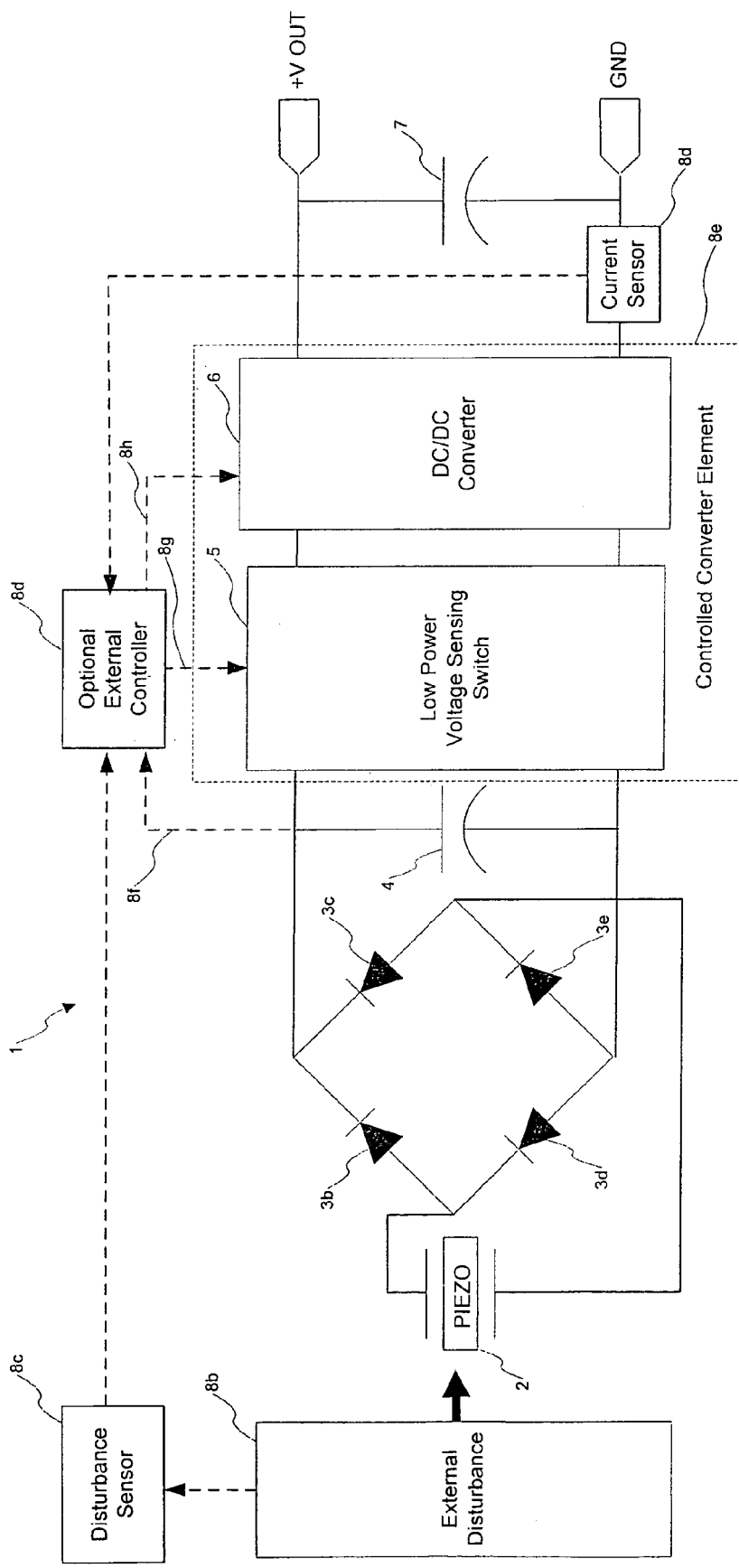
FIG. 2 is a more detailed block diagram of the invention showing the transducer, rectification and input energy storage elements.
Figure 3:
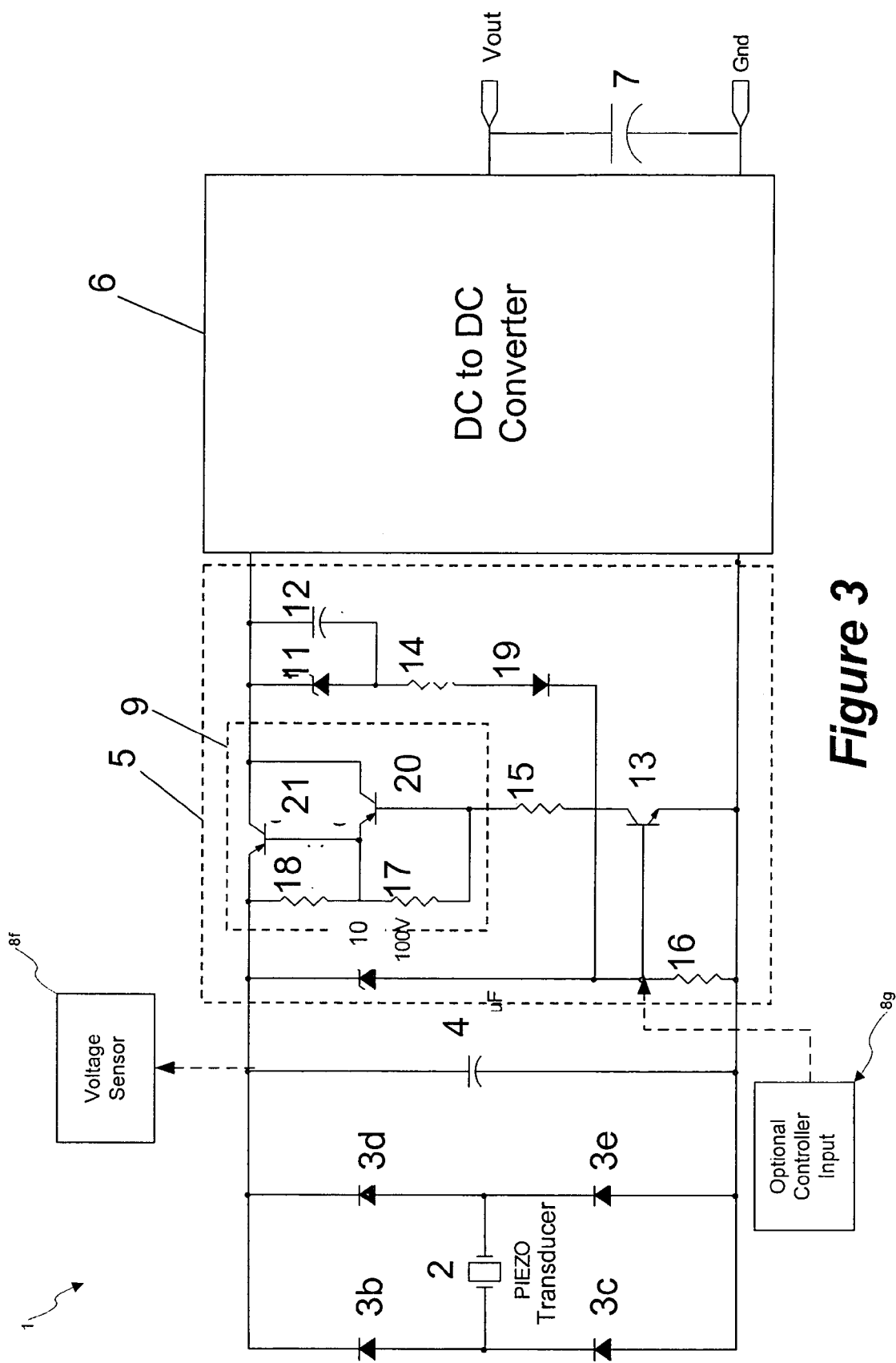
FIG. 3 is a graph of time histories of mechanical transducer strain and transducer voltage functions (in the open circuit condition).

A simplified schematic of the preferred embodiment is shown in FIG. 2 and a detailed version is given in FIG. 3. FIG. 2 shows the details of the piezo transducer 2, the rectification bridge 3a made up of a set of diodes, the input storage element 4 and the output storage element 7. In the preferred embodiment, the transducer element 2 is a piezoelectric transducer, although other electro active materials or electromechanical transducers exhibiting electromechanical coupling can be substituted.

Rectification element is made up of four diodes 3b, 3c, 3d and 3e. Alternately, other rectification schemes such as a half wave rectifier or voltage doubling rectifier as known in the art can be used interchangeably. These can affect the value of the optimal voltage range for the input storage element. For instance in the case of a voltage doubling rectifier, the optimal voltage for the input storage device will be double what it would be for the full wave rectifier.

The input storage device 4 is a low leakage capacitor; the output storage device 7 is also a low leakage capacitor but can be a battery or other electrical storage device.

FIG. 3 shows a version of the controlled conversion element in more detail. In particular, it shows the circuitry for implementing an internally controlled controlled conversion element 5 and 6. This includes a voltage sensing switch 5 as well as a DC–DC converter 6 which operates only when power is presented to its input terminals. FIG. 3 thus shows an example of a design in which the optimal voltage levels have been preset into the values of Zener Diodes 10 and 11. In addition, the switch 13 can be externally controlled by a signal 8g. The voltage sensing switch 5 consists of a pair of Zener diodes 10 and 11 which determine the high and low voltage operating switching points respectively, for transistors 13, 20 and 21, which together operate to activate the switch, various bias resistors 14, 15, 16, 17 and 18, shunt capacitor 12 and diode 19 to control current flow.

Figure 4:
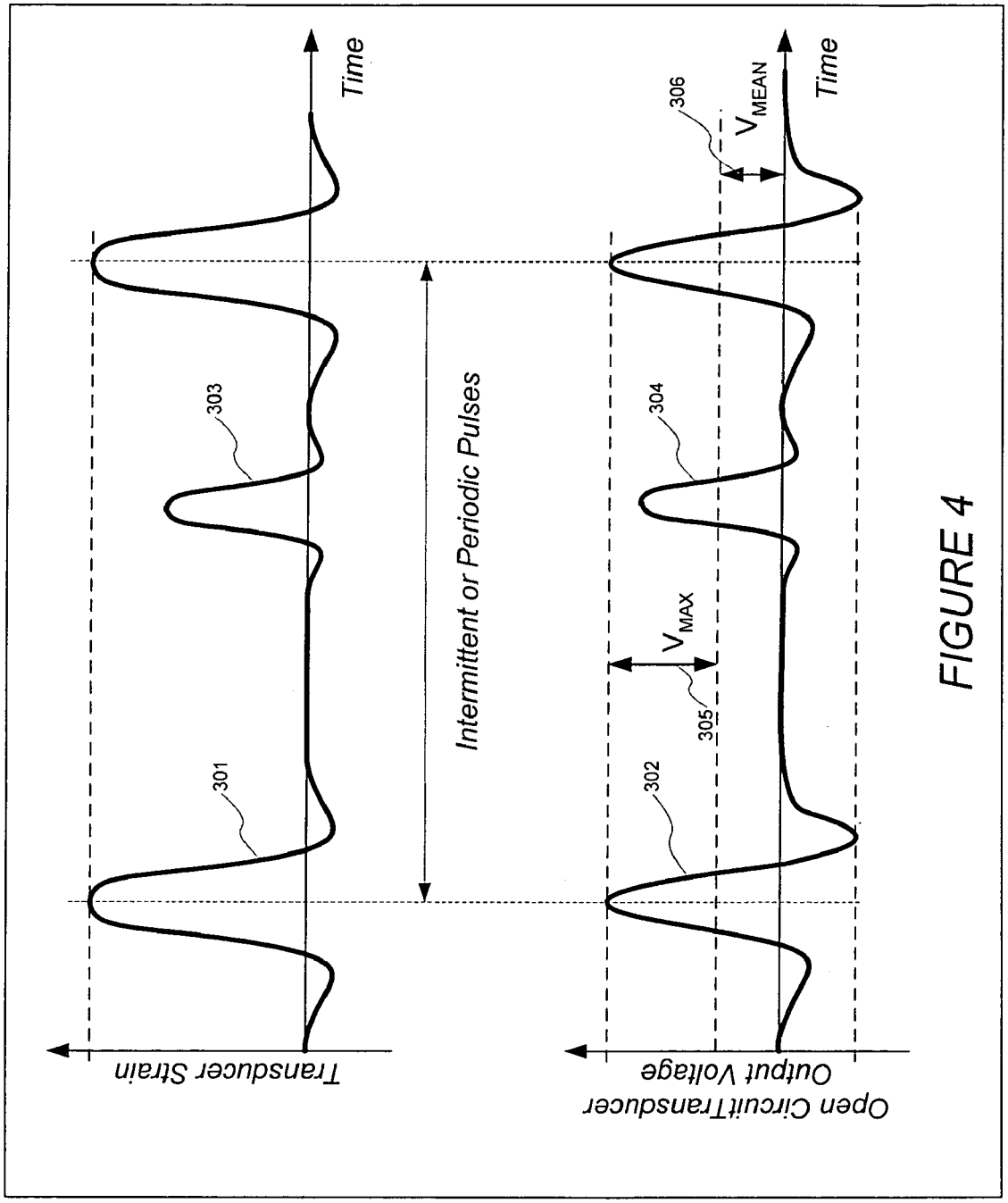
FIG. 4 is a schematic of a preferred embodiment of the system with a self-powered controlled conversion element.

The operation of the energy harvesting and storage circuit 1 is now described. Voltage and current signals from the transducer 2 typically consist of waveforms with time varying and steady components. FIG. 4 shows one example of a typical time relationship between the mechanical input to a transducer 301 and the transducer output voltage 302. The mechanical excitation signals 301 can have varying amplitude 303 or intermittent or varying timing. In general it can be an arbitrary forcing waveform with mean and time varying components.

Figure 5:
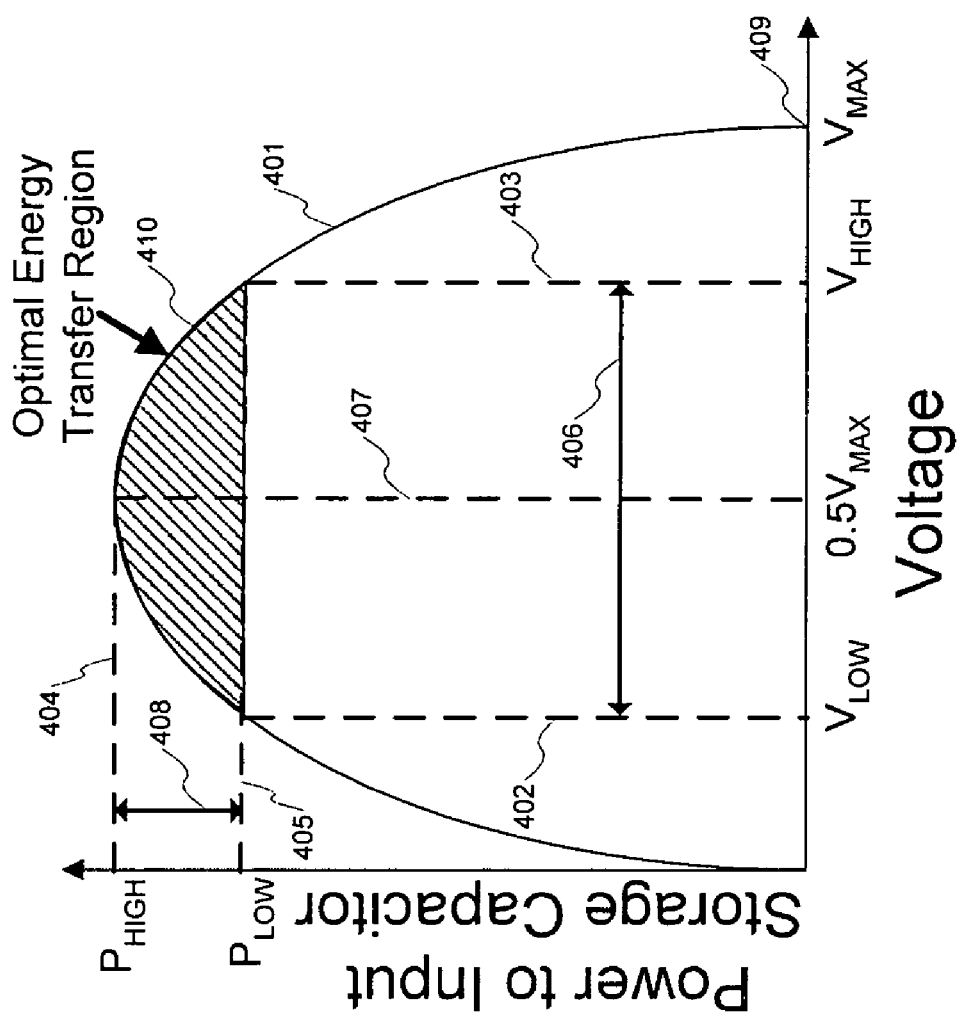
FIG. 5 is a graph showing relationship between transducer power generation as a function of the input storage capacitor voltage.
Figure 6:
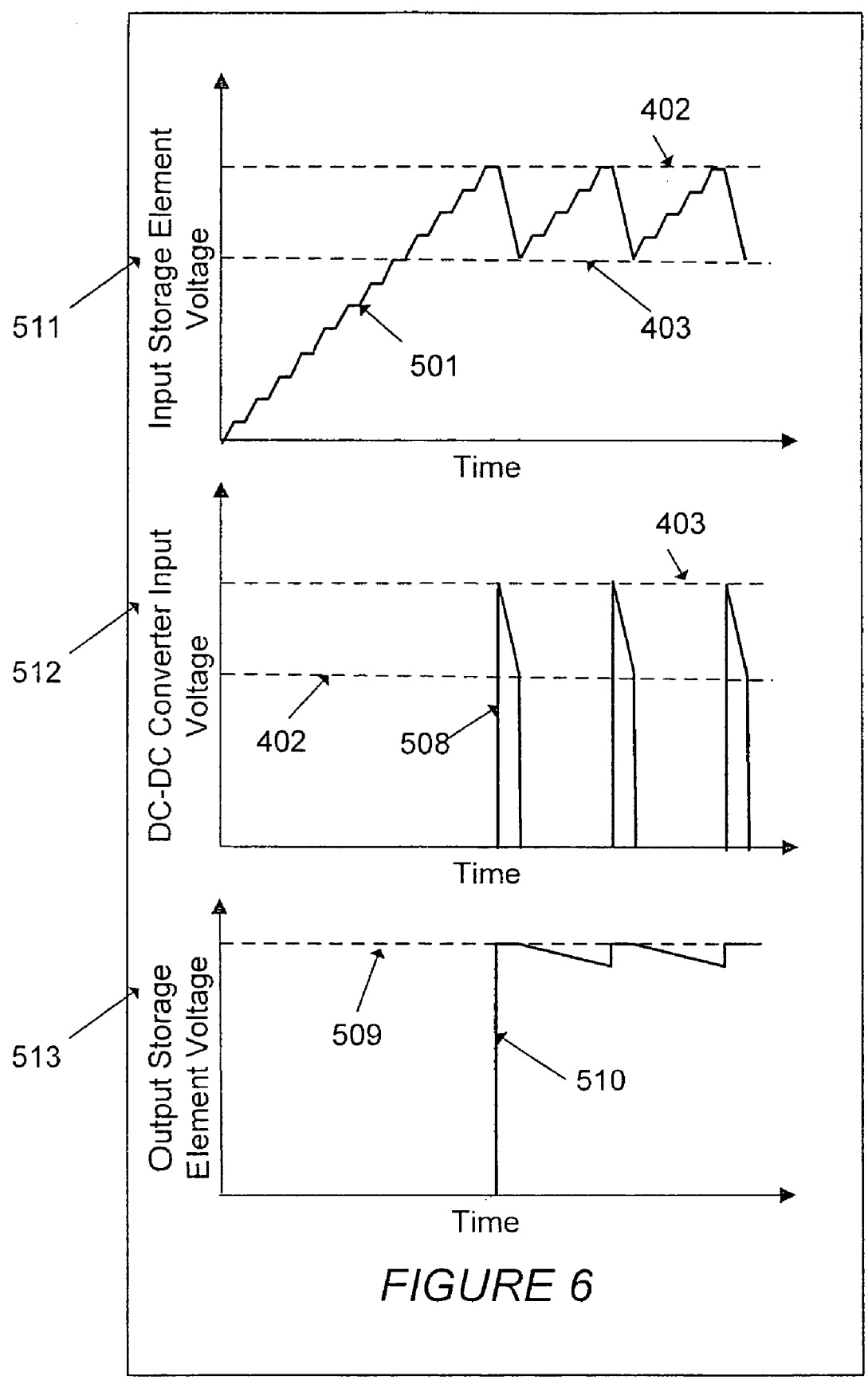
FIG. 6 is a graph of the time histories of the input storage voltage, converter input voltage and output storage voltages.

The relationship between the storage capacitor 4 voltages and the power harvesting efficiency is given in FIG. 5. In the case of alternating non-steady forcing, an important voltage level is the voltage that the input storage element would rise to if it were only connected to the rectifier bridge (i.e. no current drain to the controlled conversion element). This is a measure of the alternating (non steady) disturbance amplitude, and is designated $V_{MAX}$. For a sinusoidal disturbance, this value is equal to the amplitude of the voltage that would appear on the transducer if it were otherwise unconnected, known as the open circuit voltage. When the voltage on the input storage capacitor is approximately one-half the peak open circuit voltage (0.5 $V_{MAX}$) 407 the power transfer from the transducer is a maximum PMAX 404. The voltage sensing switch 5 thus operates to keep the voltage on the storage capacitor 4 in a fixed voltage range 406 that is optimal for harvesting energy from the electromechanical transducer 2.

The voltage on the storage capacitor 4 is constrained to a range 406 centered around the optimum value so that the electromechanical transducer 2 always sees the optimum load voltage and therefore achieves the maximum power throughput. The optimal low range $V_{LOW}$ 402 and the optimal high voltage range $V_{HIGH}$ 403, which can be determined by circuit theory, are also shown. They are generally chosen so that the input storage element is constrained to operate near but not exactly at the optimal voltage. Broadening the range allows less efficient energy transfers to the input storage element (greater variation in power to the input storage element, 410) but allows more tolerance to varying disturbance amplitudes. In the preferred embodiment, this range is between 5–40% of $V_{max}$.

If the voltage is below the critical value, $V_{LOW}$ 402, then the transfer of voltage to the DC—DC converter 6 is halted until the voltage builds up back within the optimal range 406. The DC—DC converter is connected to be self-bootstrapping as it is powered by the output of the voltage server switch. Thus, the DC—DC converter stops running when the switch opens and consumes no more power. Importantly, if the voltage stored in the capacitor attempts to go above the optimal value $V_{HIGH}$ 403, then the switch is again turned on an voltage is presented to the DC—DC converter which then draws power out of the input storage element and converts it to low voltage at the output storage element. This conversion lowers the voltage on the input storage element below the critical value $V_{HIGH}$ 403, continuing the DC—DC conversion until the switch turns off at $V_{LOW}$ 402. By maintaining the optimal voltage storage voltage range, the power transfer is held within the optimal range 406 as defined by the shaded region on the graph.

With a suitable external controller 8g and 8d controlling the voltage on the trigger transistor gate 13, the range can be made programmable responding to sensor input of the disturbance level or condition. In addition the optimal voltage level and range for the input storage capacitor can be determined by feed-forward or feedback means to optimize delivered power to the output storage element in varying disturbance conditions. In the schematic shown in FIG. 3, four diodes 3b, 3c, 3d, and 3e rectify the AC waveform to produce pulses of current that charge the storage capacitor 4 in quantum steps.

Figure 7:
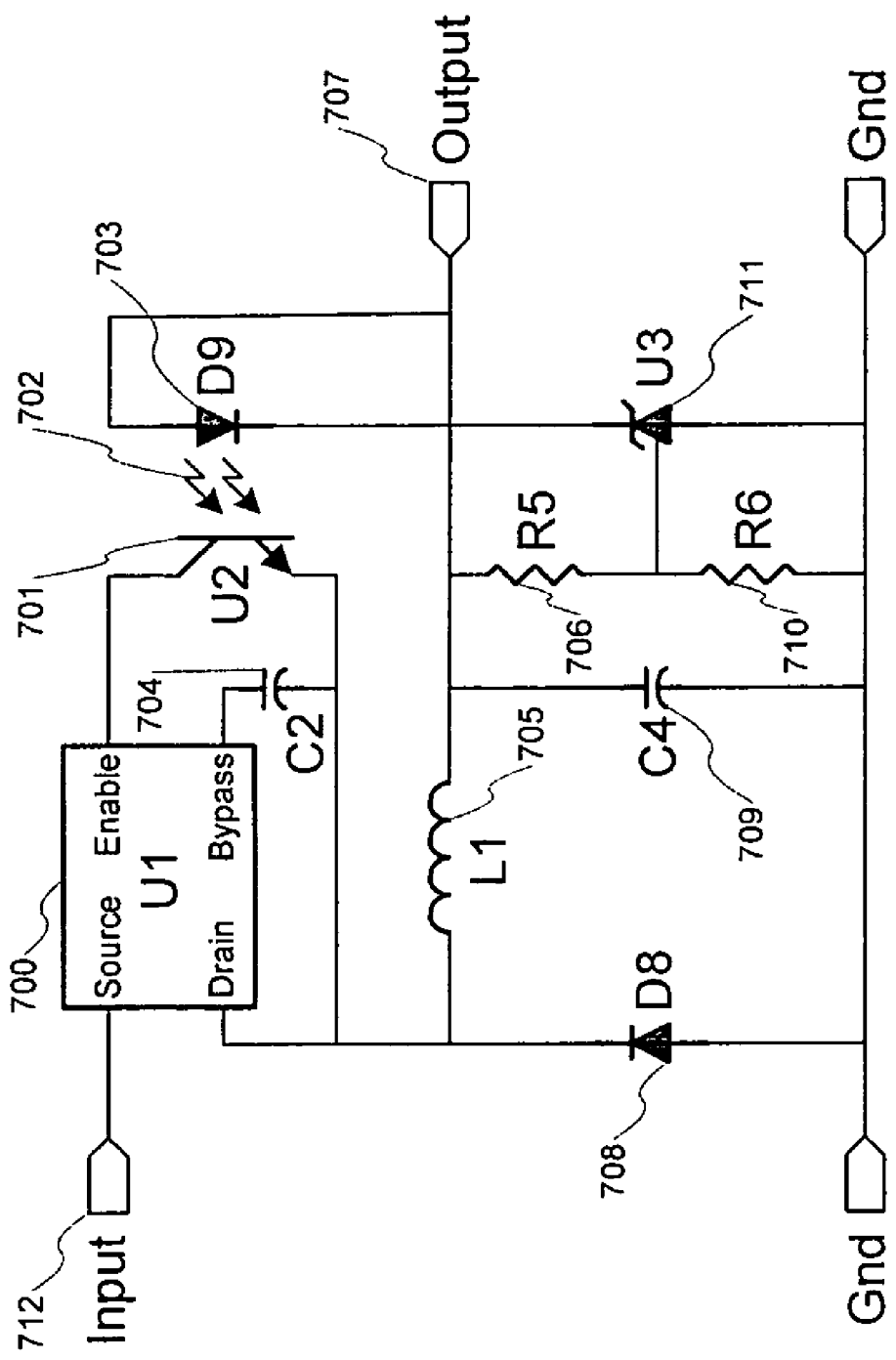
FIG. 7 is a detailed diagram of a Direct Current to Direct Current (DC—DC) converter.

FIG. 7 is a more detailed circuit diagram of the DC—DC converter 6. When power is applied to an input terminal 712 of the DC/DC converter 6, switch device U1 700 automatically starts operation. This switch 700 is part of a standard forward, or buck converter that converts the energy stored in energy storage element to a regulated voltage output 707. U1 700 is typically an electrical circuit similar to a TNY-253 and switches to provide a quasi-square wave at high frequency with a duty cycle dictated by the ratio of output voltage 707 to the input voltage 712.

Internal to U1 700 are FET drain and source connections (shown as 'D' and 'S', respectively) and a control circuit. When the FET turns on, energy is stored in L1 705. When the FET turns off, the magnetic field in L1 705 forces the current to continue flowing, but through D8 708 instead of the FET. By this repetitive action, energy is transferred to the output capacitor (C4) 709. All diodes 703 and 708 shown are designed to have very low leakage currents.

U3 711 is a precision shunt regulator configured as a reference. When the voltage on C4 709 reaches the desired output voltage, the cathode current of U3 7111 increases rapidly, turning on the optocoupler, U2 701 with light 702 generated by light emitting diode D9 703. This in turn disables U1 700, turning off the internal FET. The circuit 6 therefore operates in burst mode, supplying power pulses when required by the load connected to the output 707. Each switching cycle operates in discontinuous current mode as well, i.e. the current in L1 705 ramps down to zero before the next switching cycle begins.

Returning attention to FIG. 3, when the circuit 1 first starts operation the transducer 2 energy is accumulated at the Zener diode 10 until the voltage reaches an upper level trip point which is set by the reverse breakdown voltage of Zener diode 10. Zener diode 10 then begins to conduct at that point, providing base current for transistor 13. The turn on voltage for Zener 10 sets $V_{HIGH}$ and Zener 11 sets $V_{LOW}$. This starts a regenerative action whereby the Darlington transistor pair 9, which consists of transistors 17 and 18, turns on causing in turn Zener diode 11 to conduct, providing base current for transistor 13 through resistor 16, and zener diode 11. This sequence latches the Darlington transistor switch 9 "on", until the storage capacitor 4 has discharged to lower voltage range 506 of approximately 90 VDC. At this point Zener diode 11 ceases to conduct and base current is removed from transistor 13 which stops the flow of current and shuts off the transfer of energy from the storage capacitor 4 to the DC—DC converter 6 shutting it off. Diode 19 isolates resistor 14 from shunting resistor 16 at the time of circuit start up. When the storage capacitor voltage is held within this range, the power transfer level is thus held near an optimal value for the designed disturbance amplitude.

The low power voltage sensing switch 5 then performs two functions. The first is to monitor and keep the voltage on the capacitor 7 within a range that is optimal for the transfer of energy from the piezo transducer 2 to the storage capacitor 4. The second is to switch the energy between the storage capacitor and the load. When the voltage on the storage capacitor 4 drops to below a predetermined optimal value, then the voltage sensing switch 5 shuts off the flow of energy until the voltage on the capacitor 4 builds back up to the optimal level. If the voltage on the capacitor 4 rises above the optimal range, the switch will turn on and initiate the DC—DC conversion process dumping charge to the output storage element. If this element is at capacity and can accept no further charge then the DC—DC converter is inhibited and the voltage sensing switch 5 will thus clamp the output voltage at the top of the optimal range.

Typically, the load circuitry power requirements will be designed to periodically use the stored energy while it is in the optimal range. Alternatively, the load circuit can lie un-powered in a dormant or suspended state until sufficient energy has been built up to power the circuitry in a burst mode where the load continuously draws power until the voltage on the storage capacitor drops to below the optimal range and the power to the circuit is shut off until the energy has again built up to predetermined level. This insures that the energy is harvested and stored optimally independent of the demands of a load circuit. In either mode of use, the circuit invention will optimally transfer power from the mechanical disturbances into useable energy.

In addition to regulating the voltage on the input storage capacitor 4, the voltage sensing switch circuit 5 transfers energy from the input storage capacitor 4 in an efficient method to the DC—DC converter 6 with minimum loss of energy through leakage and other parasitic losses. This is important since the very low power produced by most piezo transducers would be lost, or severely attenuated, if it is not optimally harvested, stored and transferred to the load. The voltage sensing switch 5 only transfers energy from the storage capacitor 4 to the DC—DC converter 6 when the voltage across the capacitor 4 is in an optimal range for power transfer from the piezo transducer 2.

The DC—DC converter 6 thus converts the voltage from the level that is optimal from the energy harvesting transducer to a level that is optimal for the desired load circuit. Current out of the DC—DC converter 6 is stored in the output storage capacitor 7. Power drawn from the output storage element 7 can be used to power the load circuitry as well as the optional external control sensors, sensor conditioning electronics and control processing (8a, 8d, 8c, 8f, 8g) creating a self powered system operating entirely off of power derived from the disturbance. In the system shown in FIG. 3 without external control, the controlled conversion under internal control is entirely powered from energy derived from the disturbance.

When voltage sensing switch 5 is switched on, the DC—DC 6 converter automatically starts operation using self bootstrapping techniques known in the art. Energy from the DC—DC converter is then stored in an output capacitor 7; the circuit output voltage 510 is regulated by the DC—DC converter 6 when the voltage sensitive switch 5 and DC—DC converter 6 are on. When the DC—DC converter 8 is turned off by the voltage sensing switch 5, the output storage capacitor 7 continues to supply energy to the load with voltage droop as shown in FIG. 5. When sufficient energy has been collected by the input storage capacitor 4 the voltage selective switch 5 and DC—DC converter 6 are again activated and process repeats as shown in FIG. 5.

The circuit 1 mitigates the effects of leakage by design and component selection. Because the average continuous power flow from the transducer 2 can be so small (on the order of hundreds of microwatts, typically) there is little available power to operate the switch 5 by monitoring the voltage on the storage capacitor 3 and make a decision to switch on the converter 6 to convert energy from the storage capacitor 4 to the selected output voltage 7. It is not typically practical to harvest the piezo transducer 2 power on a continuous basis. This is due to the fact that the DC—DC converters 6 cannot operate directly off the relatively small amount of power generated by the piezo transducer 2, since the quiescent power losses greatly exceed the power available. Therefore the DC–DC converter is operated in discontinuous mode, only when triggered by the activation of the switch 9 in the critical input storage element voltage range. When voltage is presented to the input of the DC—DC conversion element, it is powered off of this voltage and initiates the power transfer.

This discontinuous operation, triggered by the voltage threshold event, is important to accommodate situations where there can be considerable time between disturbance excitations. The system thus does not rely on a steady disturbance level, but only on the amount of eventual accumulated power to trigger the DC—DC conversion. This allows there to be long periods of comparative inactivity in which no quiescent power is dissipated. This ability to weather disturbance droughts is important for micro-power systems.

This circuit is also required to store very small energy pulses over a relatively long time, in a low-leakage storage capacitor 4, and then periodically discharge that capacitor 4 into a load (at a substantially higher rate perhaps 1 to 3 watts) whose voltage is typically much lower than the optimum load for the piezo transducer 2 to generate its optimum power. In this embodiment, the electronic low loss voltage switch 5 required to keep the voltage on the storage capacitor within a narrow range uses a pair of zener diodes 9 and 11 that control transistor switches 9B shown in schematic of FIG. 4. Zener diodes in the high voltage range (90–100 volts) are typically required to optimally harvest power from the piezo transducer, and typically have very low leakage, and drain negligible energy from the storage capacitor 4.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for harvesting energy from a transducer comprising:
    an input storage element, connected to receive an energy signal originated by the transducer and to store electrical energy received therefrom;
    a controlled conversion element, connected to the input storage element and to provide a converted signal therefrom, and to constrain an input storage element voltage value to vary only within a controlled operating voltage range that varies from a low operating voltage value to a high operating voltage value, the high operating voltage value being less than a peak open-circuit voltage value that corresponds to an input storage element voltage value to which the input storage element would rise under excitation if no other circuit elements were attached to it;
    an output storage element, connected to the controlled conversion element, and to store energy received from the converted signal; and
    a load circuit, connected to receive energy from the output storage element,
    wherein the controlled operating voltage range is derived by determining a maximum average power throughput from the transducer to the load circuit.

2. An apparatus as in claim 1 wherein the controlled conversion element further comprises:
    a switch, connected to receive the energy signal originated by the transducer, and to provide a switched energy signal therefrom; and
    a voltage controller, connected to control the switch.

3. An apparatus as in claim 1 wherein a center point of the controlled operating voltage range is about one-half of the peak open-circuit voltage value.

4. An apparatus as in claim 1 additionally comprising:
    a rectifying bridge, connected to the transducer, for receiving an electrical signal therefrom and for providing the energy signal as a rectified signal.

5. An apparatus as in claim 1 wherein the controlled conversion element uses an external controller to set the high and low operating voltage values.

6. An apparatus as in claim 5 wherein the external controller is powered from harvested energy.

7. An apparatus as in claim 2 wherein the controlled conversion element additionally comprises:
    a Direct Current to Direct Current (DC—DC) converter, connected to receive the switched energy signal, and to provide energy to the output storage element.

8. An apparatus as in claim 7 wherein the DC—DC converter couples electric power from the switched energy signal to a load circuit.

9. An apparatus as in claim 1 wherein the apparatus is self-powered from harvested energy.

10. An apparatus as in claim 1 wherein the conversion element is powered from harvested energy.

11. An apparatus as in claim 7 wherein the controlled conversion element ensures that the DC—DC converter controls the energy signal such that the conversion element runs discontinuously in such a manner to approximately optimize power transfer from the input storage element to the output storage element.

12. An apparatus for harvesting energy from a transducer comprising:
   an input storage element, connected to receive an energy signal originated by the transducer and to store electrical energy received therefrom;
   a controlled conversion element, connected to the input storage element and to provide a converted signal therefrom, and to constrain an input storage element voltage value to vary only within a controlled operating voltage range that varies from a low operating voltage value to a high operating voltage value, the high operating voltage value being less than a peak open-circuit voltage value that corresponds to an input storage element voltage value to which the input storage element would rise under excitation if no other circuit elements were attached to it; and
   an output storage element, connected to the controlled conversion element, and to store energy received from the converted signal,
   wherein the controlled operating voltage range is programmable.

13. An apparatus for harvesting energy from a transducer comprising:
   an input storage element, connected to receive an energy signal originated by the transducer and to store electrical energy received therefrom;
   a controlled conversion element, connected to the input storage element and to provide a converted signal therefrom, and to constrain an input storage element voltage value to vary only within a controlled operating voltage range that varies from a low operating voltage value to a high operating voltage value, the high operating voltage value being less than a peak open-circuit voltage value that corresponds to an input storage element voltage value to which the input storage element would rise under excitation if no other circuit elements were attached to it; and
   an output storage element, connected to the controlled conversion element, and to store energy received from the converted signal,
   wherein the controlled operating voltage range is set by bias points in an electronic circuit.

14. An apparatus as in claim 13 wherein the controlled conversion element further comprises:
   a pair of Zener diodes, arranged to determine the high and low controlled operating voltages respectively; and
   a pair of transistors, arranged to activate the voltage sensing switch.

15. An apparatus as in claim 14 wherein the controlled conversion element additionally comprises:
   one or more bias resistors, a shunt capacitor, and a diode arranged to control current flow through the voltage sensing switch.

16. A method for harvesting energy from a transducer comprising:
   storing electrical energy received from an energy signal originated by the transducer in an input storage element;
   converting the energy stored by the input storage element in a controlled fashion to provide a converted signal therefrom, the conversion constraining an input storage element voltage value to vary only within a controlled operating voltage range that varies from a low operating voltage value to a high operating voltage value, the high operating voltage value being less than a peak open-circuit voltage value that corresponds to an input voltage value to which the input storage element would rise if not other circuit elements were attached to it;
   further storing energy in the converted signal in an output storage element; and
   connecting a load circuit to receive energy from the output storage element,
   wherein the controlled operating voltage range is derived by determining a maximum average power throughput from the transducer to the load circuit.

17. A method as in claim 16 additionally comprising:
   operating a pair of Zener diodes, arranged to determine the high and low controlled operating voltages respectively; and
   activating the voltage sensing switch via a pair of transistors.

18. A method as in claim 17 additionally comprising:
   operating one or more bias resistors, a shunt capacitor, and a diode arranged to control current flow through the voltage sensing switch.

19. A method as in claim 16 wherein the step of controlled converting further comprises:
   providing a switched energy signal from a voltage switch connected to receive the energy signal originated by the transducer; and
   controlling the voltage sensing switch.

20. A method as in claim 16 wherein a center point of the controlled operating voltage range is about one-half of the peak open-circuit voltage value.

21. A method as in claim 16 additionally comprising:
   rectifying an electrical signal produced by the transducer, to provide the energy signal as a rectified energy signal.

22. A method as in claim 16 additionally comprising:
   setting the controlled operating voltage range under programmable control.

23. A method as in claim 16 additionally comprising:
   setting the controlled operating voltage range via bias points in an electronic circuit.

24. A method as in claim 19 wherein the voltage sensing switch additionally comprises:
   performing a Direct Current to Direct Current (DC—DC) conversion on the switched energy signal to provide energy to the output storage element.

25. A method as in claim 16 additionally comprising:
   self-powering the apparatus from harvested energy.

26. A method as in claim 16 wherein the conversion step is powered from harvested energy.

27. A method as in claim 19 additionally comprising the step of:
   controlling the energy signal such that the controlled conversion element runs discontinuously in such a manner to approximately optimize power transfer from the input storage element to the output storage element.

* * * * *